US007959074B1

(12) United States Patent
Chopra et al.

(10) Patent No.: US 7,959,074 B1
(45) Date of Patent: Jun. 14, 2011

(54) SELECTIVE AUTHORIZATION OF ITEM TRANSACTIONS

(75) Inventors: Rajiv Chopra, Bellevue, WA (US);
Scott D. White, Seattle, WA (US); Scott M. Silver, Seattle, WA (US); Edward E. Bardusch, Kent, WA (US); Kiran J. Achyutuni, Bangalore (IN); David T. Margrave, Bellevue, WA (US);
Richendra Khanna, Seattle, WA (US);
Hisham Al-Shurafa, Seattle, WA (US);
Mark A. Harburg, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1237 days.

(21) Appl. No.: 11/537,463

(22) Filed: Sep. 29, 2006

(51) Int. Cl.
*G06K 5/00* (2006.01)
(52) U.S. Cl. .................. 235/380; 235/375; 235/472.01
(58) Field of Classification Search .................. 235/379, 235/472.01, 472.02, 472.03, 380
See application file for complete search history.

(56) References Cited

U.S. PATENT DOCUMENTS 6,188,756 B1 * 2/2001 Mashinsky ............... 379/207.04

* cited by examiner

*Primary Examiner* — Karl D. Frech
(74) *Attorney, Agent, or Firm* — Seed IP Law Group PLLC

(57) ABSTRACT

Techniques are described for use in selectively authorizing proposed transactions under certain circumstances, such as when payments for the transactions are not assured. In some situations, when payments to a merchant from customers are not assured for proposed item acquisition transactions involving those customers, determinations are made to authorize and proceed with at least some of those proposed transactions in an automatic and selective manner without the assurance of receiving the payments for the selected transactions. For example, a selective determination of whether to authorize a proposed transaction may be made based on analyzing information about the proposed transaction (e.g., about the item(s) involved in the transaction, a payment amount of the transaction, the customer(s) involved in the transactions, etc.) and on information regarding other prior transactions. If a proposed transaction is authorized, the merchant may then proceed to initiate fulfillment of the transaction before the merchant receives payment.

63 Claims, 8 Drawing Sheets

Example Item Transaction Table

| Transaction ID 209 | Item ID(s) 211 | Customer ID 213 | Time 215 | Date 217 | Day 219 | Price 221 | Number of Items Viewed 223 | Payment Method 225 | Payment Approval 227 | ... 229 |
|---|---|---|---|---|---|---|---|---|---|---|
| 5545 | 8318 | 0182 | 4:05 PM | 2/9/XX | Thu | 5.69 | 2 | Credit | Y | |
| 6231 | 0023, 0777 | 0223 | 12:23 PM | 2/15/XX | Wed | 625.00 | 3 | Credit | Y | |
| 3987 | 2569 | 3247 | 1:18 AM | 1/26/XX | Thu | 75.24 | 1 | Debit | N (hard) | |
| 3426 | 0023 | 2478 | 9:00 AM | 1/15/XX | Sun | 599.00 | 5 | Credit | N (soft) | |
| 4218 | 8318 | 5571 | 6:09 PM | 1/30/XX | Mon | 5.69 | 1 | Credit | Y | |
| ... | | | | | | | | | | |

210

220a
220b
220c
220d
220e

Example Item Table

| Item ID 231 | Category ID 233 | Delivery Type 235 | In Stock Amount 237 | Estimated Ship Date to Recipient 239 | Item Name 241 | ... 243 |
|---|---|---|---|---|---|---|
| 0023 | 0500 | Physical | 33 | 2/24/XX | ABC | |
| 8318 | 0266 | Electronically | — | 2/21/XX | BCD | |
| 0777 | 0893 | Physical | 78 | 2/24/XX | CDE | |
| 2569 | 0454 | Physical | 0 | 3/5/XX | DEF | |
| ... | | | | | | |

Example Customer Table

| 251 Customer ID | 253 Age | 255 Age Of Account | 257 Customer Phone Number | 258 Customer Phone Type | 259 Last Contact Customer Service | 261 Last Payment Decline | 263 Zip Code | 265 Email Domain | 267 |
|---|---|---|---|---|---|---|---|---|---|
| 0182 | 56 | 1 month | 773-555-1212 | landline | 3 months ago | -- | 60615 | \<FreeService1\> | |
| 0223 | 35 | 5 years | -- | -- | -- | -- | 98121 | \<PaidService1\> | |
| 3247 | 18 | 2.5 years | 732-555-4444 | landline | -- | 2 years ago | 08817 | \<PaidService2\> | |
| 2478 | 22 | 3 months | 212-987-6543 | cellphone | -- | 2 months ago | 10025 | \<FreeService2\> | |
| 5571 | 41 | 1 year | 612-555-1234 | VOIP account | -- | 8 months ago | 55842 | \<FreeService1\> | |
| ... | | | | | | | | | |

*Fig. 2B*

Example Potential Item Transactions To Be Selectively Authorized

269    Scenario 1: Customer 2478 proposes to buy the following:

(2) of Item 0023 at $625.00 and a date of delivery to the customer in 10 days
        (1) of Item 8318 at $5.69 with a date of delivery in 2 days 271    Scenario 2: Customer 0223 proposes to purchase the same items 273    Scenario 3: Same transaction as Scenario 1, but the transaction has previously received a soft decline

*Fig. 2C*

SELECTIVE AUTHORIZATION OF ITEM TRANSACTIONS

TECHNICAL FIELD

The following disclosure relates generally to techniques for authorizing transactions, such as to automatically and selectively authorize to proceed with item sales transactions when payment is not assured based on information specific to the transactions.

BACKGROUND

The Internet comprises a vast number of computers and computer networks that are interconnected through communication links, with information being exchanged using various services such as electronic mail, FTP, and the World Wide Web (or "Web"). The Web allows a server computer system (e.g., a Web server providing a Web site) to send graphical Web pages of information to a remote client computer system, which the remote client computer system can then display, such as via a Web browser executing on the client computer system.

In addition to merely providing access to information, the Web has increasingly become a medium that is used to search for, shop for and order items (such as products, services and/or information) that are for purchase, rent, lease, license, trade, evaluation, sampling, subscription to, etc. In many circumstances, a user can visit the Web site of a Web merchant (or a "Web store") or otherwise interact with an online merchant or retailer or electronic marketplace that provides one or more items, such as to view information about the items, give an instruction to place an order for one or more items, and provide information needed to complete the purchase (e.g., payment and shipping information). After receiving an order for one or more items, a Web merchant then fulfills the order by providing the ordered items to the indicated recipient. The items may be products that are delivered electronically to a recipient (e.g., music downloaded over the Internet) or through physical distribution channels (e.g., paperback books shipped via a governmental postal service or private common carrier). The items may also be services that are provided either electronically (e.g., providing email service) or physically (e.g., performing cleaning services at the house of the purchaser). The order fulfillment process typically used by Web merchants for product items that are to be physically provided shares similarities with other item ordering services that ship ordered items (e.g., catalog-based shopping, such as from mail-order companies), such as to deliver ordered items from one or more physical distribution or fulfillment centers operated by or on behalf of the Web merchant.

Electronic commerce involving item acquisition transactions between a merchant and customers frequently involves the merchant interacting with one or more third-party payment processing systems (e.g., credit card payment processing systems, an ACH ("Automated Clearing House") payment processing system, etc.) in order to obtain payment approval or guarantee for payment from a customer. When provided with information about a indicated payment amount (or an indicated amount to be reserved or held for later payment) and an indicated payment instrument (e.g., a particular credit card, bank or other financial account, etc.) for a particular person, such payment processing systems may respond with an approval of the amount (e.g., by obtaining payment or sending a guarantee of payment under at least some specified circumstances), a soft decline (e.g., when a credit card is over its limit, an expiration date is near or has been passed, or the payment instrument issuer is unavailable), or a hard decline (e.g., a credit card has been reported lost or stolen). Soft declines may be resubmitted for approval later, and often may be approved at that time if circumstances have changed. However, even if a payment processing system indicates approval for an order, payment may not be obtained in some situations if specified circumstances occur. For example, if a payment instrument being used is not physically inspected by a merchant, such as is typically the case for online merchants, the merchant may bear the risk of non-payment for credit card usage that is later determined to be unauthorized.

When payment is not immediately obtained or guaranteed, a merchant faces a dilemma of either proceeding to fulfill an order, but at the risk of not being paid, or of not fulfilling the order until payment is obtained or guaranteed, but at the risk of inconveniencing the customer and potentially losing their business. The dilemma is particularly problematic when a customer needs an item provided immediately. A payment guarantee or other payment approval may not be available at the time an order is placed for various reasons. For example, third-party payment processing systems may be inaccessible when the payment processing systems are not functioning, when the communication link between the merchant and the payment processing system is not functioning, or when components of the merchant's system that are used to assist or perform the interacting with the payment processing systems are not functioning.

Thus, it would be beneficial to provide techniques to assist merchants when payment for a transaction is not guaranteed, as well as to provide additional benefits.

BRIEF DESCRIPTION OF THE DRAWINGS

FIGS. 2A-2C provide examples of selectively authorizing proposed item transactions for which payment is not assured.

DETAILED DESCRIPTION

Techniques are described for authorizing proposed transactions with associated payments under certain circumstances. In at least some embodiments, when payments to a merchant from customers are not assured for proposed item acquisition transactions involving those customers, determinations are made to authorize and proceed with at least some of those proposed transactions in an automatic and selective manner without the assurance of receiving the payments for the selected transactions. For example, a selective determination of whether to authorize a proposed transaction may be made based on analyzing information about the proposed transaction (e.g., about the item(s) involved in the transaction, a payment amount of the transaction, the customer(s) involved in the transactions, etc.) and/or on information regarding other prior transactions, as discussed in greater detail below. If a proposed transaction is selectively authorized, the merchant may then proceed to initiate fulfillment of the transaction before the merchant receives payment (e.g., by beginning to prepare to ship or otherwise provide the item(s) for the transaction to a designated recipient, and/or by actually performing the shipping or other providing of the items). Subsequently, payment may be obtained for those selectively authorized transactions after the transaction fulfillment process has been initiated, such as during the process or after the process is completed. In at least some embodiments, the described techniques are performed by an automated Selective Authorization system, as described in greater detail below, such as to support the handling of proposed item transactions for one or more merchants or for other parties involved in payment-based transactions.

Figure 1:
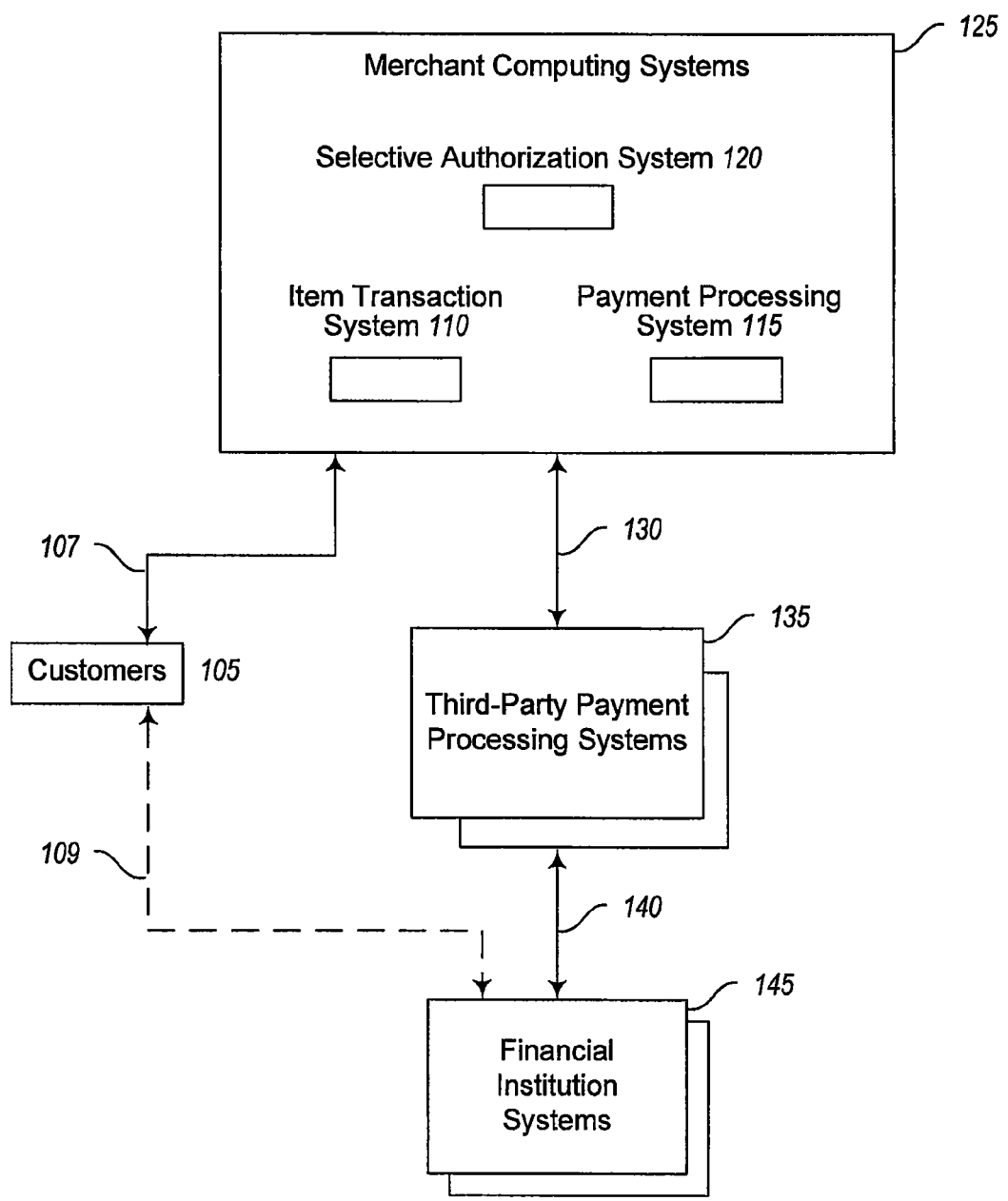
FIG. 1 illustrates example interactions related to authorizing proposed item acquisition transactions.

FIG. 1 illustrates examples of various types of interactions related to authorizing proposed item acquisition transactions. In particular, FIG. 1 illustrates one or more computing systems 125 of an example online merchant that provides an Item Transaction system 110. In this example, the Item Transaction system makes available a Web store or other online marketplace (not shown) from which customers 105 may acquire items. The customers use client computing systems (not shown) to perform various interactions 107 with the Item Transaction system, such as to initiate proposed item acquisition transactions (e.g., by placing orders to purchase or otherwise acquire items, as well as by providing associated delivery and payment information). In this example, the customers may each have one or more payment instruments (e.g., credit cards) that are issued by one or more financial institutions 145, such as based on prior interactions 109 (whether electronic or otherwise) between the customers and the financial institutions. Information about those payment instruments (e.g., credit card number, expiration date, name on the account, etc.) are provided in this example to the Item Transaction system by the customers for use in supplying payment for the proposed item transactions.

As part of handling item acquisition transactions proposed by customers, the Item Transaction system interacts with a Payment Processing system 115 of the merchant to obtain payment for the transactions, although in other embodiments such payment processing functionality may instead be part of the Item Transaction system. In this example, the Payment Processing system 115 uses the payment instrument information for the customers and the payment amount information associated with the proposed transactions (e.g., the costs of the items and any associated taxes and fees), and interacts 130 with one or more third-party payment processing systems 135 to attempt to obtain payment and/or an assurance of payment for the proposed transactions. The third-party payment processing systems 135 may, for example, include one payment processing system for each type of payment instrument, such as systems that act as intermediaries between the merchant and the financial institution(s) that provide payment instruments of that type. Payment assurance from a third-party payment processing system may include, for example, a guarantee that payment is available and/or will be provided for a particular payment instrument and payment amount, such as under any circumstances. If payment is approved only under specified circumstances, however, the payment is assured to the merchant only if the merchant can verify those specified circumstances. For example, a third-party credit card payment processing system may indicate that a payment is approved for a particular proposed item acquisition transaction using an indicated credit card, but the payment may be guaranteed only if the merchant physically verified the credit card or if the credit card use was actually authorized by the card holder. Thus, if the merchant did not physically verify the credit card or have some verification that the credit card use was actually authorized, the payment is not assured to the merchant at the current time based on the approval.

In order to determine whether to provide such a payment assurance for a particular proposed item acquisition transaction using a particular payment instrument, a particular third-party payment processing system 135 in the illustrated example interacts 140 with a financial institution system 145 that corresponds to the payment instrument, such as a bank that issued the payment instrument to a customer. The financial institution may respond by providing information to the third-party payment processing system regarding the payment instrument and payment amount, such as to indicate whether or not the payment amount is approved for the payment instrument. For example, the response from the financial institution to the third-party payment processing system may indicate that the payment instrument has been reported stolen or lost (and thus payment using the payment instrument is not approved, such as to result in a hard decline), that associated information provided for the customer using the payment instrument does not match the financial system's records for the customer (and thus payment using the payment instrument is not approved, such as to result in a hard or soft decline), that the payment instrument does not have sufficient capacity to make the payment amount (and thus payment using the payment instrument is not approved, such as to result in a soft decline), that the payment instrument does have sufficient capacity to make the payment amount and no other problems exist (and thus payment using the payment instrument is approved, such as to result in an approval), etc. The third-party payment processing system then responds to the Payment Processing system 115 with an indication of whether the proposed item acquisition transaction is approved based on the information received from the financial institution, such as to indicate that the transaction is approved only if an affirmative response is received from the financial institution (e.g., to decline to authorize the transaction if no response is obtained from the financial institution or if a negative response is received). In other embodiments, the Payment Processing system 115 may instead interact directly with at least some financial institutions 145 without interacting with an intermediary third-party payment processing system 135.

If the Payment Processing system 115 receives an indication from a third-party payment processing system that payment is approved for a proposed item acquisition transaction, the merchant proceeds with the proposed transaction, such as by initiating fulfillment of an order for one or more items to be delivered to a designated recipient. Such order fulfillment may be performed at one or more fulfillment centers (not shown) that are operated by or otherwise affiliated with the merchant, such as by placing product items into packages and shipping them to designated recipients.

However, if the Payment Processing system 115 does not receive an indication from a third-party payment processing system that payment is approved for a proposed item acquisition transaction, the merchant in the illustrated embodiment instead may elect to use a Selective Authorization system 120 to determine whether to selectively authorize the proposed transaction, as discussed in greater detail below. If authorization for a proposed item acquisition transaction is received from the Selective Authorization system, the merchant in the illustrated embodiment proceeds to initiate fulfillment of an order for the transaction before payment is received by or otherwise assured for the merchant, although in some embodiments and situations the merchant may later decide whether to withdraw the order from the normal fulfillment process before it is shipped or otherwise delivered based on additional information available at that later time regarding whether payment for the transaction has been obtained or is otherwise assured. The lack of approval from a third-party payment processing system for a proposed item acquisition transaction may be caused in various ways in various embodiments, such as based on an inability to perform interactions 130 with a third-party payment processing system (e.g., based on a network or other communication link between the merchant systems 125 and the third-party payment processing systems 135 being unavailable, due to the third-party payment processing system 135 itself being unavailable, due to the Payment Processing system 115 being unavailable, due to payment-related or other transaction-related information from the Item Transaction System being unavailable to the Payment Processing system 115, etc.), and/or based on some or all types of non-approval responses that are received from a third-party payment processing system (e.g., based on an inability of the third-party payment processing system to obtain information for use in affirmatively responding to the Payment Processing system 115, such as due to an inability to perform interactions 140, and/or based on a financial institution indicating a hard or soft decline of the payment for a proposed item acquisition transaction). In other embodiments, the Selective Authorization system may not be used in some situations, such as if a hard decline and/or a soft decline is received from a third-party payment processing system (e.g., if the proposed item transaction will instead be rejected under those circumstances). Conversely, in some embodiments the Selective Authorization system may further be used in some additional situations, such as even if the Payment Processing system 115 does receive an indication from a third-party payment processing system that payment is approved for a proposed item acquisition transaction (e.g., to verify whether to proceed with a proposed item acquisition transaction if payment is not assured in all situations, such as for an online merchant that has not physically verified a payment instrument and still bears the risk of fraudulent use of the payment instrument by parties other than the owner or holder of the payment instrument).

Thus, the Selective Authorization system may be used in various ways in various embodiments to assist a merchant or other entity in determining whether to authorize proposed item acquisition transactions, such as by automatically performing a selective authorization for each of various proposed item acquisition transactions. As previously noted, such selective authorization for a proposed item acquisition transaction may in at least some embodiments be based on various information about the proposed transaction and/or on various information about prior transactions. In some embodiments, information about at least some prior transactions may be analyzed to identify factors that typically reflect particular types of transactions and/or outcomes for transactions. For example, the analysis may include identifying positive transaction-related factors that are associated with prior selectively authorized transactions in which corresponding payment was later successfully obtained and/or may include identifying positive transaction-related factors that are associated with other prior transactions that were successfully completed. In addition, the analysis may include identifying negative transaction-related factors that are associated with prior selectively authorized transactions in which corresponding payment was not later successfully obtained and/or may include identifying negative transaction-related factors that are associated with other prior transactions that were not successfully completed. In addition to identifying positive and/or negative transaction-related factors, various weights may be assigned to factors to reflect their degree of correspondence to successful and/or non-successful transactions, respectively, such as based on a statistical analysis that indicates a degree of correlation for the factor to the positive or negative transaction outcome. The identified positive and/or negative factors may then be used to determine whether to authorize a proposed transaction based on whether sufficient positive factors are present for the proposed transaction and/or whether sufficient negative factors are not present for the proposed transaction, such as by generating a weighted authorization score for the positive and/or negative factors present for the proposed transaction, and determining whether the authorization score exceeds a specified threshold (e.g., a predetermined threshold for some or all types of transactions).

In at least some embodiments, multiple collections of prior transactions may be selected and analyzed separately, such as to use similar prior transactions to produce information for use in determining whether to selectively authorize a current proposed transaction. The collections of related transactions may be determined in various ways, such as based on transactions involving the same or similar dollar amounts, transactions using the same type of payment instrument, transactions in the same geographical area, transactions using the same or similar methods of providing the items to the recipient (e.g., shipping method), transactions involving the same items, transactions involving the same number of items, transactions involving the same type of items, etc. Payment instruments may further be of various types in various embodiments, including, but not limited to, credit cards, debit cards, ACH ("Automated Clearing House") transactions, electronic benefits transfer (e.g., using cards associated with a flexible spending account or with government benefits), loyalty points programs (e.g., frequent flier points), gift cards, electronic gift certificates, via use of third-party payment intermediaries (e.g., PayPal), purchase orders, wire transfers, etc. In some embodiments, collections of prior transactions are analyzed to determine factors associated with payment not being obtained at all, whether initially or subsequently obtained, while in other embodiments the prior transactions may be analyzed for factors associated with payment being obtained only initially (e.g., so additional processing is not spent performing multiple, subsequent payment approval attempts). In some embodiments, a statistical model may be built and stored for each collection of prior transactions based on the analysis.

The selective authorization of proposed item transactions may be performed in various ways in various embodiments. For example, in at least some embodiments, selective authorization may be used only for certain types of transactions (e.g., transactions requesting overnight or same day shipping, transactions involving only certain types of items, transactions involving only certain types of payment instruments, transaction that have previously passed one or more screens for fraud, etc.), while in other embodiments the selective authorization may be used for all transactions. If a proposed transaction is not selected to be selectively authorized, the proposed transaction may not be fulfilled until payment is assured (e.g., by contacting the customer for an alternative payment instrument, waiting to receive an approval response from a third-party payment processing system, etc.). Furthermore, in some embodiments, the selective authorization determination is further based in part on costs for not authorizing the transaction immediately if the transaction is later authorized (e.g., faster shipping costs, customer dissatisfaction, and concessions to the customer), such as high costs that may be associated with a date (e.g., Christmas) by which the items are to be provided. In embodiments in which the use of selective authorization of proposed item transactions is triggered by or otherwise occurs when assurance of or other information about availability of payments for proposed transactions is not available from one or more external sources (e.g., one or more third-party payment processing systems), various information regarding the unavailability of the information from the external sources may further be used in determining which proposed item transactions to consider for selective authorization and/or as part of the selective authorization process. For example, shortly after the information from the external sources becomes unavailable, only certain proposed item transactions may be selected in some embodiments for selective authorization (e.g., based on an amount of time until delivery or other providing of the items for the order is expected, such as to select proposed item transactions to selectively authorize if the fulfillment process should begin soon in order to meet expected shipment or delivery times). If the period during which the information from the external sources is unavailable continues, additional proposed item transactions may be selected for selective authorization based on or more criteria (e.g., based on amounts of time until delivery or other providing of the items for the additional proposed item transactions being within a predetermined threshold; by lowering thresholds related to which proposed item transactions qualify to be selected; by considering all proposed item transactions after the delay in receiving information from the external sources exceeds a predetermined threshold; etc.). Furthermore, in some embodiments limits may be used for the proposed item transactions that are selectively authorized (e.g., during a period in which information from the external sources is unavailable), such as to selectively authorize only a certain number of proposed item transactions (e.g., up to 10,000 per day) and/or proposed item transactions with a cumulative value during a particular period of time. Furthermore, the various thresholds (e.g., for times, such as related to delays in which information from external sources related to payments for proposed item transactions is unavailable; related to which proposed item transactions to consider for selective authorization; related to which proposed item transactions to selectively authorize; etc.) may be determined in various ways in various embodiments, including automatically and/or manually, and in some embodiments may be manually set and/or modified by human operators to reflect current conditions.

As previously noted, payment approval may not be obtained for a proposed transaction for a variety of reasons. In some embodiments, the Selective Authorization system may adapt the selective authorization determination based in part on the reason why payment assurance or other indication of payment approval is not obtained. For example, the Selective Authorization system may consider information about the reasons for an indicated payment decline (e.g., card indicated as lost versus over the payment limit).

For illustrative purposes, some embodiments are described below in which a particular type of merchant selectively authorizes particular types of item acquisition transactions in particular ways. However, those skilled in the art will appreciate that the techniques can be used in a wide variety of other situations, including with other types of merchants (e.g., service providers, brick and mortar merchants), for situations other than item acquisition transactions, using other factors, and in situations other than with a merchant (e.g., third-party payment intermediaries), and that the invention is not limited to the exemplary details provided.

FIGS. 2A-2C provide examples of selectively authorizing proposed item transactions for which payment is not assured based on using information about prior transactions. In these examples, the merchant is an online merchant that ships the items via conventional distribution channels.

In particular, FIG. 2A illustrates two example tables, an Item Transaction Table 210 and an Item Table 230. The Item Transaction Table 210 contains various example information related to prior transactions at the merchant. For purposes of illustration for this example, FIGS. 2A-2B represent snapshots of a small subset of corresponding information that may be analyzed in various manners, with actual numbers of transactions possibly numbering in the hundreds, thousands, millions, etc. In this example, the Item Transaction Table 210 contains several rows 220a-220e that each represent a prior transaction, with various details about each transaction being illustrated. In particular, the table has a header row with cells that describe the content of the columns below, including a unique Transaction ID ("Identifier) 209, the Item ID(s) 211 involved in the transaction, Customer ID 213 of the customer involved in the transaction, Time 215, Date 217, Day 219, Price 221, number of items viewed prior to initiating the proposed transaction 223, Payment Method 225 and Payment Approval 227. Various other types of information may further be stored and analyzed for each transaction in other embodiments, such as a unique ID(s) for one or more payment instruments used, a total payment amount for the transaction, a shipping method, an indication of whether the transaction is fast tracked due to a desire or requirement to complete the transaction quickly (e.g., based on a promise date for when items will be shipped and/or arrive, which may also be explicitly indicated), indication of item, type of currency used for the payment, an indication of any payment-related errors or other payment state, etc. While various possible positive and negative factors based on prior transactions are discussed with respect to FIG. 2C, it will be appreciated that larger numbers of prior transactions will typically be used to identify such factors.

The Item Table 230 contains various information about various example items that are available to be acquired by customers. In particular, the Item Table contains rows 240a-240d that each correspond to a particular example item, and contain various information about the item. The table has a header row with cells that describe the content of the columns below, including Item ID 231 (which correspond to the Item IDs in column 211 of the Item Transaction Table), an item Category ID 233, an associated Delivery Type 235, a current In-stock Amount 237, a current Estimated Ship Date to a Recipient 239 if ordered now (or within a predefined time period), and an Item Name 241. Item categories and other types may be represented in various ways and at varying level of details in various embodiments, such as "electronics" generally, "DVD players" more specifically, "portable DVD players" more specifically, etc., and various item attributes and/or tags may further be stored in some embodiments, whether instead of or in addition to other indications of item type or category. Various other types of information may further be stored and analyzed for each item in other embodiments, such as a unique ID(s) for each of one or more item types for an item other than item categories, current item price, etc.

FIG. 2B illustrates an example table of information related to customers, and in particular an example Customer Table 250. In this example, the illustrated Customer Table 250 includes rows 260a-260e which each represent a customer, and columns for Customer ID 251 (which correspond to column 213 of the Item Transaction Table 210), customer Age 253, Age Of Account 255 with the merchant indicating the amount of time that the customer has had an active account, Customer Phone Number 257, Customer Phone Type 258, an indication of the amount of time since a Last Contact with Customer Service 259, an indication of the amount of time since a Last Payment Decline 261, Zip Code 263, and Email Domain 265. Various other types of information may further be stored and analyzed for each customer in other embodiments, such as indications of geographic location other than zip code, an indication of one or more IP addresses used by the customer when interacting with the merchant, indications of one or more billing and/or shipping addresses associated with the customer, indications of one or more payment instruments associated with the customer, indications of one or more payment instrument types used with the customer, an indication of an amount of time since the first successful order for the customer, indications of time-related information in absolute days and/or times rather than relative to a current time, an indication of a number of successful and/or unsuccessful prior transactions by the customer, an indication of an assessed reputation or trust level for the customer at the merchant, an indication of an assessed reputation or trust level for the customer at one or more external sites or information services, indications of one or more other types of activities of the customer with respect to the merchant (e.g., providing content and/or feedback), an indication of types of software and/or systems/devices used by the customer when interacting with the merchant, other customer demographic information, etc. All of the types of attributes indicated in the columns for tables 210, 230 and 250 are possible factors that may be positively or negatively associated with successful item transaction fulfillment, as are the other types of information that are indicated to possibly be used in other embodiments.

FIG. 2C describes several examples of proposed item acquisition transactions that may be considered for selective authorization. For example, in scenario 1 (labeled 269), an example Customer 2478 initiates a proposed item acquisition transaction on an example date of 02/20/XX, which involves buying two copies of item 0023 at $625 each with a delivery date in 10 days, and buying one copy of item ID 8318 at $5.69 for delivery in 2 days. In this example, the Selective Authorization system determines not to selectively authorize the proposed transaction without assurance of payment based on one or more of various negative factors, such as using information about the customer, the two copies of item 0023, and prior related transactions. For example, the determination may consider negative factors related to the customer, such as that the customer 2478 recently had a transaction declined (as shown in row 260d of Customer Table 250 of FIG. 2B), that the customer's contact information includes only a cellphone (which may be more likely to be used by customers who attempt fraudulent transactions since they are not tied to physical addresses in the same manner as landlines), that the customer uses email via a particular free email service (which may have policies that allow fraudulent use), etc. Such negative factors may have previously been determined, for example, based on an analysis of a large number of prior transactions (not shown) that correlated such factors with transactions in which payment was not successfully obtained, such as for all items, transactions and customers, or instead for a particular collection of transactions to which the current transaction is related. In addition, other negative factors in this example may be based on the items involved in the proposed item transaction, such as based on Item 0223 being a relatively expensive item (so the merchant may be out a large amount of money if it incorrectly authorizes the transaction) and/or being of a category or type that is often involved in fraudulent or otherwise unsuccessful transaction. While various positive factors may also be present, such as based on a type of payment instrument or other payment type indicated for the transaction (not shown), they are not sufficient in this example to outweigh the negative factors. As previously discussed, such factors may be combined in various ways, such as in a weighted manner, and compared to a predetermined or dynamically selected threshold. Moreover, another consideration that weighs in favor of declining to perform a selective authorization in this example, and instead waiting to see if payment can be obtained or assured, is that the delivery date for the two copies of the expensive item is significantly in the future, so that the delivery date can still be met if transaction fulfillment is later initiated within a day or two. While not illustrated in this example, in other embodiments the Selective Authorization system may further perform selective authorization for each item in a transaction, such as to in this example decline to selectively authorize the portion of the transaction involving the two copies of Item 0023 at the current time, but to optionally determine to selectively authorize the portion of the transaction involving Item 8318 (e.g., based on the relatively low item cost, the short delivery date, a type of the item, etc.).

Unlike the first scenario of FIG. 2C, in the second scenario 271, Customer 0223 proposes the same item acquisition transaction as that of scenario 269, but in this example the transaction is selectively authorized before assurance of payment for the merchant is received. Differentiating factors for scenario 271 relative to scenario 269 may include, for example, one or more factors related to the customer (e.g., as indicated in row 260b of Customer Table 250, Customer 0223 is a longtime customer of the merchant without any payment declines, uses a particular paid email service, etc.) and/or related to the transaction (e.g., based on a particular type of payment instrument indicated for the transaction). The third example scenario 273 of FIG. 2C is similarly related to the first scenario 269, but in this example the transaction has already received a soft decline from a third-party payment processing system, and thus it is even more unlikely that the transaction will be selectively authorized than for the first scenario. In this case, rather than waiting to determine if payment can be obtained or authorized (and thus potentially preventing other customers from obtaining those two copies of Item 0023 if they are held for the proposed transaction, since the current stock of the item is relatively low as indicated in row 240a of table 230), the transaction may instead be declined outright and the customer notified appropriately.

While FIGS. 2A-2C have illustrated several examples of using prior transactions and other information to determine whether to selectively authorize proposed transactions when payment assurance has not been received, it will be appreciated that in other embodiments various additional information about prior activities and prior transactions may be used, and that at least some of the illustrated types of assessment information may not be used.

Figure 3:
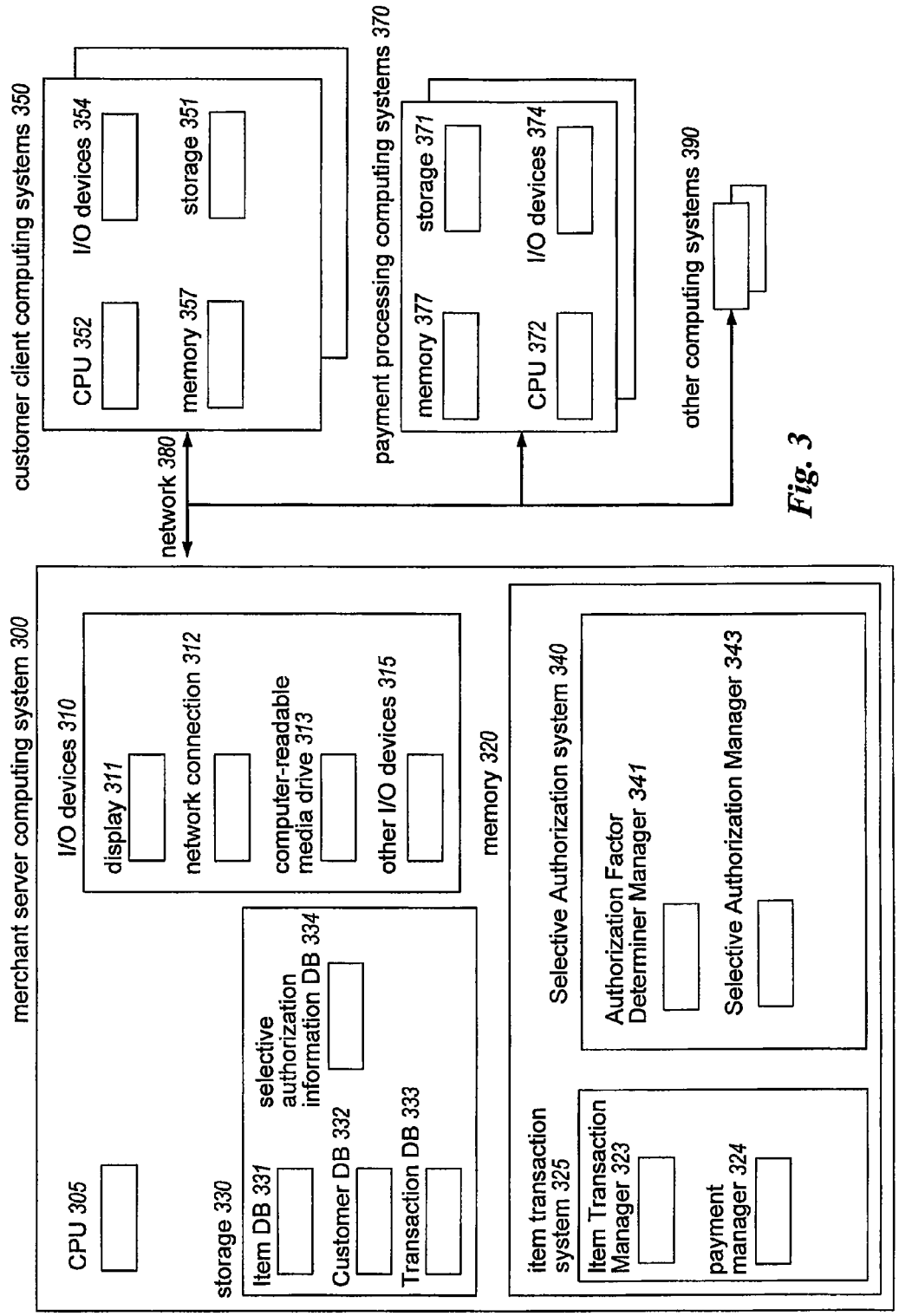
FIG. 3 is a block diagram illustrating a computing system suitable for executing an example embodiment of a Selective Authorization system.

FIG. 3 is a block diagram of an example merchant server computing system 300 suitable for executing an embodiment of the Selective Authorization system to perform selective authorization of proposed item or payment transactions, as well as various customer client computer systems 350, third-party payment processing computing systems 370, and other computing systems 390 (e.g., computing systems of various financial institutions). In the illustrated embodiment, the server computing system 300 includes a CPU 305, various I/O components 310, storage 330, and memory 320. The I/O devices include a display 311, network connection 312, computer-readable media drive 313 and other I/O devices 315 (e.g., a mouse, keyboard, etc.).

An embodiment of the Selective Authorization system 340 is executing in memory 330, as is an embodiment of an item transaction system 325 with which the Selective Authorization system 340 is interacting in the illustrated embodiment, although in other embodiments the Selective Authorization system 340 may instead provide selective authorization services to one or more other systems on remote computing systems (e.g., computing systems 390). In this example, the item transaction system 325 and/or Selective Authorization system 340 may interact with other computing systems over the network 380 (e.g., via the Internet and/or the World Wide Web). For example, customer client computing systems 350 may interact with the item transaction system to place orders for various items or to otherwise initiate proposed item acquisition transaction. In this example, the item transaction system includes an Item Transaction Manager component 323 that performs the interactions with the customers and other aspects of fulfilling item transactions, as well as a Payment Manager component 324 to process payments for the item transactions. The Payment Manager component may interact with one or more of the payment processing computing systems 370 to receive payment approvals and declines, payment guarantees and other assurances, and/or to obtain payment. The item transaction system may use various information during its operation, including customer-related information in the Customer database ("DB") data structure 332 on storage 330, item-related information in the Item DB data structure 331 on storage 330, and information about proposed and completed transactions in the Transaction DB 333 data structure on storage 330.

The illustrated embodiment of the Selective Authorization system 340 includes an Authorization Factor Determiner Manager component 341, which determines factors to use in the selective authorization determination by analyzing collections of related prior transaction and stores related information in the selective authorization information DB data structure 334 on storage 330, and a Selective Authorization Manager component 343, which determines whether to selectively authorize a proposed transaction using the determined factors from the DB 334 (e.g., in a dynamic manner in response to requests from the item transaction system, by analyzing groups of proposed item transactions in batch mode, etc.). The Selective Authorization system 340 may similar use various item-related, transaction-related and user-related information in storage 330, such as in DBs 331, 332, and 333.

It will be appreciated that the illustrated computing systems are merely illustrative and are not intended to limit the scope of the present invention. The server computing system 300 may instead include multiple interacting computing systems or devices, and computing system 300 may be connected to other devices that are not illustrated, including through one or more networks such as the Internet, via the World Wide Web ("Web"), or via private networks (e.g., payment processing networks, mobile communication networks, etc). More generally, a server or client computing system or device may comprise any combination of hardware or software that can interact, including (without limitation) desktop or other computers, network devices, PDAs ("Personal Digital Assistants"), cellphones, wireless phones, pagers, electronic organizers, Internet appliances, television-based systems (e.g., using set-top boxes and/or personal/digital video recorders), and various other consumer products that include appropriate inter-communication capabilities. Similarly, other illustrated computing systems may also be executed as part of multiple interacting computing systems. In addition, the functionality provided by the various Selective Authorization system components may in some embodiments be combined in fewer components or distributed in additional components, and the functionality of some of the components may instead not be provided as part of the Selective Authorization system and/or other additional functionality may be available.

It will also be appreciated that, while various items are discussed or illustrated as being stored in memory or on storage while being used, these items or portions of them can be transferred between memory and other storage devices for purposes of memory management and data integrity. Alternatively, in other embodiments some or all of the software components may execute in memory on another device and communicate with the illustrated computing system via inter-computer communication. Some or all of the system components and/or data structures may also be stored (e.g., as software instructions or structured data) on a computer-readable medium, such as a hard disk, memory, a network, or a portable media article (e.g., a DVD or flash memory devices) to be read by an appropriate drive or via an appropriate connection. The system modules and data structures can also be transmitted via generated data signals (e.g., by being encoded in a carrier wave or otherwise included as part of an analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
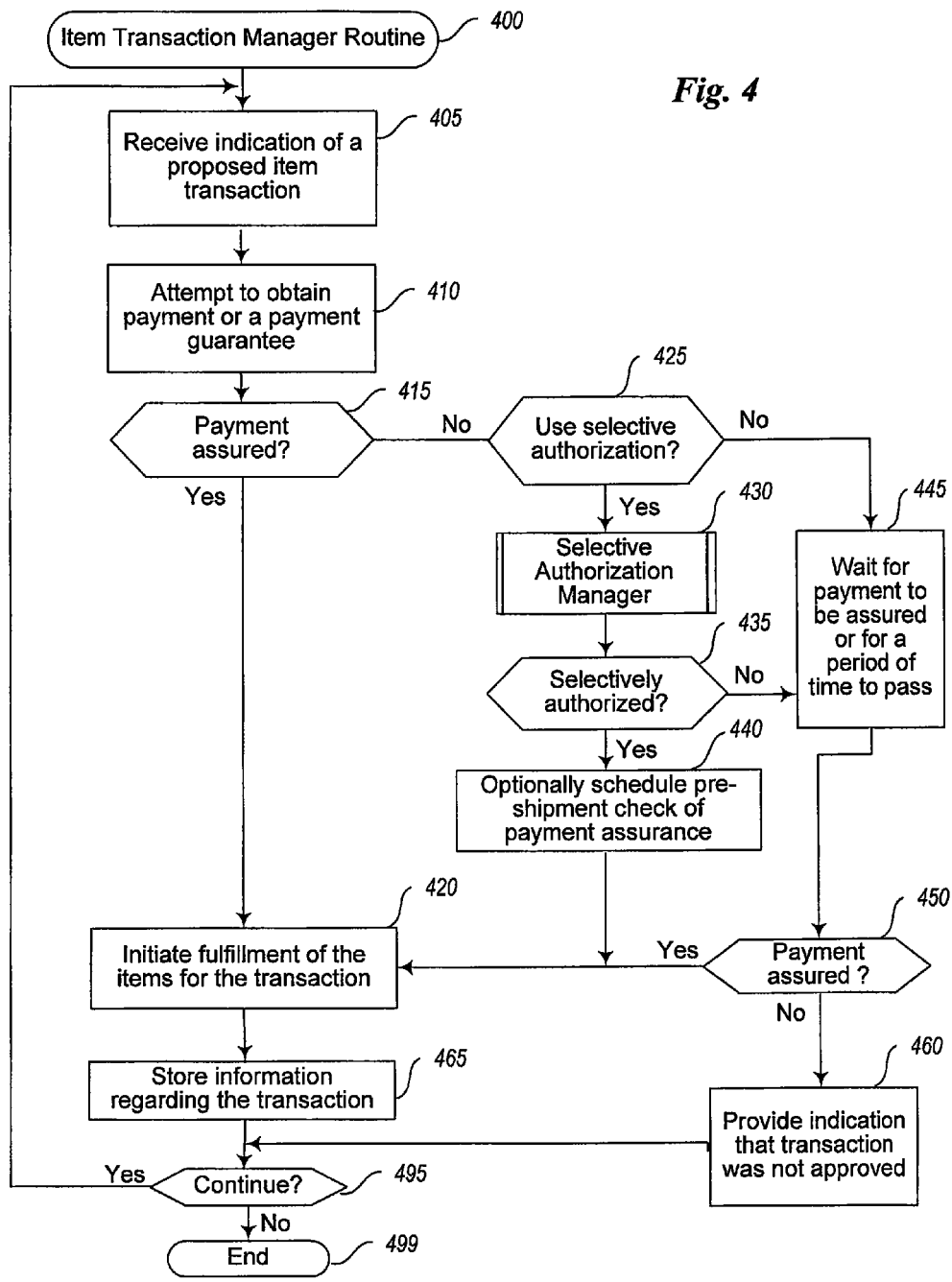
FIG. 4 is a flow diagram of an example embodiment of an Item Transaction Manager routine.

FIG. 4 is a flow diagram of an embodiment of an Item Transaction Manager routine 400. The routine may, for example, be provided by execution of the item transaction system 325 of FIG. 3 and/or the Item Transaction system 110 of FIG. 1, such as to provide functionality for a merchant to allow customers to initiate item acquisition transactions.

The routine begins at step 405, where an indication is received about a proposed item transaction. The indicated information may include one or more items to be acquired, payment information, and additional information as appropriate (e.g., a customer identifier, shipping destination, an indicated amount for the transaction). After receiving the indication of the proposed transaction, the routine continues to step 410, where the routine attempts to obtain payment (e.g., by interacting with a third-party payment processing system, such as under the control of internal payment processing functionality). Subsequently, at step 415, the routine determines if the payment for the transaction is assured (e.g., payment is received, payment is guaranteed unconditionally or under conditions that the merchant has satisfied, etc.). If not, the routine continues to step 425, and if so proceeds to step 420. At step 420, the routine initiates fulfillment of the transaction, such as by adding the order for the transaction to a queue to be fulfilled by a fulfillment center of the merchant. After step 420, the routine continues to step 465 to store information regarding the transaction for later use, such as for use in determining positive factors related to successful transactions. After step 465, the routine proceeds to step 495, where it determines whether to continue (e.g., to receive and process additional transactions). If so, the routine returns to step 405, and if not ends at step 499.

Figure 6:
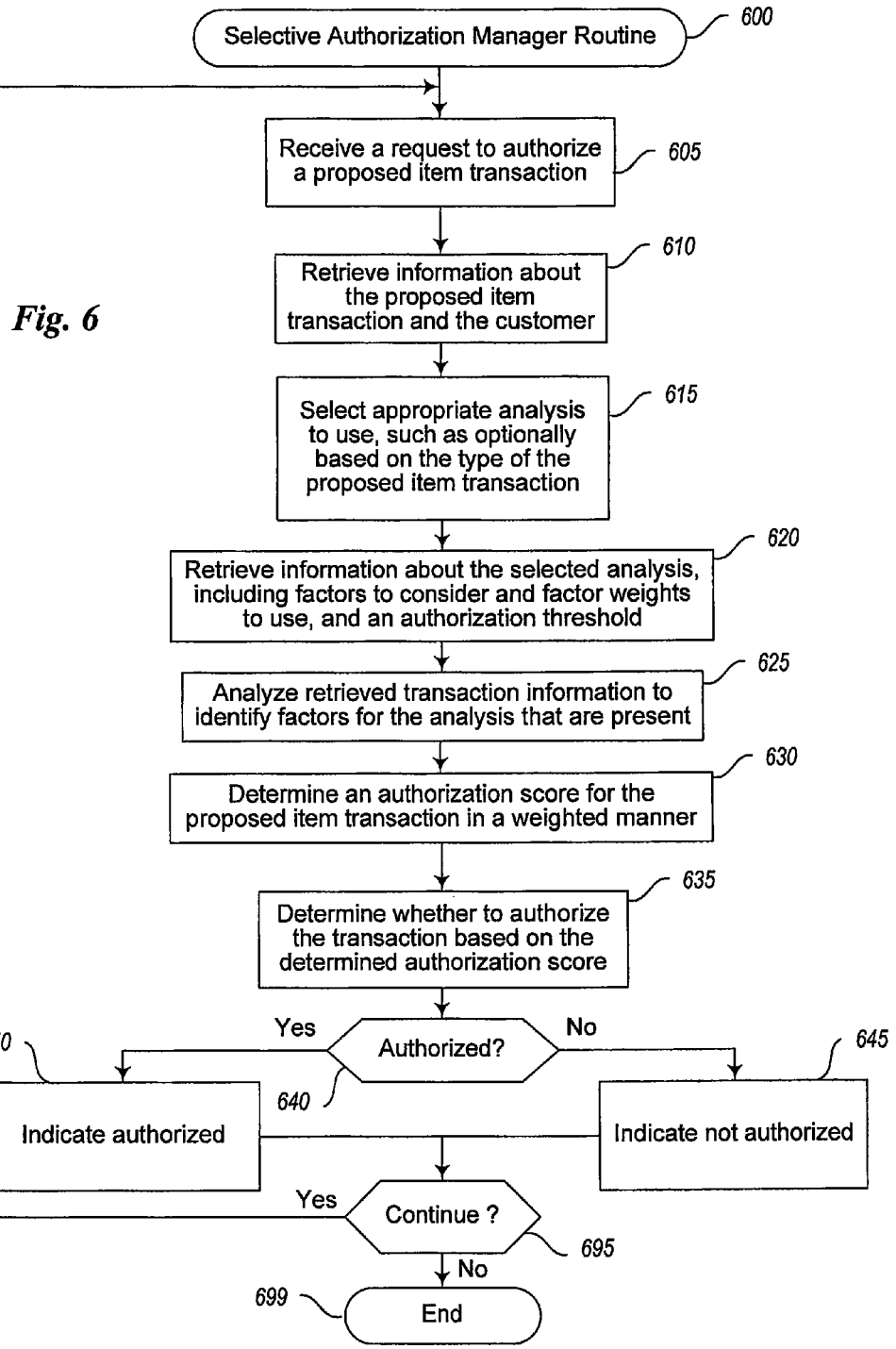
FIG. 6 is a flow diagram of an example embodiment of a Selective Authorization Manager routine.

If it is instead determined that payment is not assured at step 415, the routine proceeds to step 425 to determine whether to consider selective authorization for the proposed transaction. As described elsewhere, selective authorization may be triggered automatically under various conditions, including based on information specific to this proposed transaction (e.g., based on shipping method, the type of items, the date the item is to be provided or delivered to the recipient, the type of payment instrument used, a reason payment was declined, etc.). If it is determined to consider selective authorization, the routine proceeds to step 430 to execute a Selective Authorization Manager (an embodiment of which is illustrated in FIG. 6) to receive a determination of whether to selectively authorize the transaction without payment being assured. If it is determined in step 435 that the transaction was selectively authorized, the routine continues to step 440 to optionally schedule a later pre-shipment check of the status of the payment authorization for the authorization at that time, and then continues to step 420 to initiate fulfillment of the transaction.

If it is instead determined not to consider selective authorization in step 425 or to use selective authorization for this transaction in step 435, the routine continues to step 445 to in the illustrated embodiment wait until payment is obtained or otherwise assured (e.g., after communication is re-established with a third-party payment processing system that will provide an approval or decline for the transaction) or until a timeout period occurs. The routine then continues to step 450 to determine if payment is now assured, and if so continues to step 420 to initiate transaction fulfillment. If not, the routine continues to step 460 to indicate that the transaction was not approved (e.g., by generating an email or other notification to be provided to the customer), and then proceeds to step 495. While not illustrated here, the routine may further store information about non-successful transactions, such as for later use in determining negative factors related to unsuccessful transactions.

Although not illustrated here, various other steps may be performed in some embodiments. For example, in some embodiments, one or more fraud checks may additionally be performed related to transactions (e.g., performing an AVS ("Address Verification Service") check, verifying a credit card code, etc.), such as before considering selective authorization. In addition, in some embodiments, if a hard decline is indicated by the payment processing system, the routine may immediately provide indications that the transaction was not approved.

Figure 5:
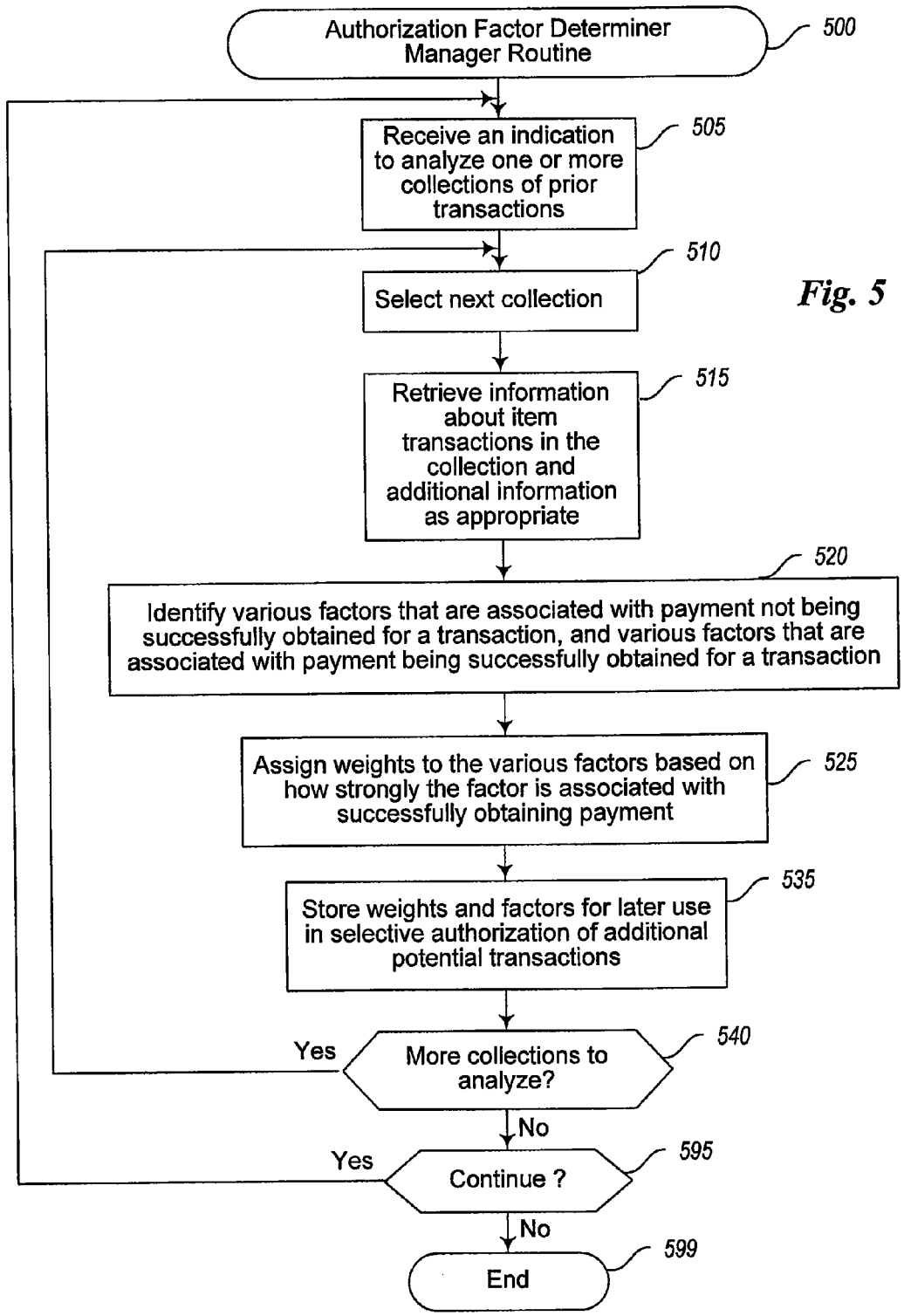
FIG. 5 is a flow diagram of an example embodiment of an Authorization Factor Determiner Manager routine.

FIG. 5 is a flow diagram of an embodiment of an Authorization Factor Determiner Manager routine 500. The routine may, for example, be provided by execution of the Authorization Factor Determiner Manager component 341 of FIG. 3, such as to perform one or more analyses of collection of related prior transactions in order to determine factors correlated to successful and/or unsuccessful transactions.

The routine begins at step 505, where the routine receives a request to analyze one or more collections of related prior transactions. The request may be generated automatically, such as at periodic intervals (e.g., every month, every season, etc.), or the request may be initiated by an automated component (e.g., a Selective Authorization Manager component) and/or by a human representative. After receiving the request, the routine continues to step 510, where it selects a next collection, beginning with the first. In step 515, the routine retrieves information about the prior transactions and additional information as appropriate. In some embodiments, the additional information may include information about related customers' previous transactions at the merchant or elsewhere, information about related customers' previous non-transaction interactions with the merchant or elsewhere (e.g., click-stream of pages visited when selecting the items in the transaction, contribution of customer reviews, contribution of content such as to a product wiki or shopping list, etc.), additional information about the items in the transactions (e.g., prices, item categories, etc.), information from external systems (e.g., information about the customer from an affiliated marketplace, credit scores, etc.), etc. In some embodiments, a subset of all possible factors is selected and provided, such as to limit the analysis to determining which (if any) of the pre-selected factors have positive and/or negative influence or other correlations to item transaction success.

Once all the information is received, the routine proceeds to step 520, where it identifies various factors that are associated with payment being successfully obtained and/or not being successfully obtained. In some embodiments, various calculations (not shown) may also be performed based on the retrieved information before examining it as a potential factor. For example, the routine may calculate the time elapsed since the customer's last transaction (e.g., based on the current date and the date of the last transaction), the age of the customer, the time the transaction was made in the customer's normal time zone, or the day of the week the transaction was made. In some embodiments, the analysis includes building a regression or other statistical model to assist in determining the relevant factors. After the various factors are identified, the routine continues to step 525, where the routine assigns weights to the factors based on how strongly each factor is associated with payment being successfully obtained (e.g., positive weights for positive factors, and negative weights for negative factors). The routine then stores the various weights and factors in step 535, such as in the selective authorization information DB 334 of FIG. 3. The routine then continues to step 540 to determine if there are other collections of prior transactions to analyze, and if so the routine returns to step 510. If not, the routine proceeds to step 595 to determine whether to continue, and if so returns to step 505, and if not ends at step 599.

FIG. 6 is a flow diagram of an embodiment of a Selective Authorization Manager routine 600. The routine may, for example, be provided by execution of the Selective Authorization Manager component 343 of FIG. 3, such as to determine whether to selectively authorize proposed item acquisition transactions.

The routine begins at step 605, where the routine receives a request to authorize a proposed item acquisition transaction. After receiving the request, the routine continues to step 610 to retrieve information about the proposed item transaction and the related customer, such as the item(s), payment information, shipping information, etc. In step 615, the routine then determines the appropriate authorization analysis to use, such as to select information based on an analysis of a collection of prior transactions that are related to the proposed transaction. The analysis used may further be determined, for example, based on the type of items involved in the proposed transaction, the customer initiating the transaction, and/or the type of payment instrument. After determining which analysis to use, the routine continues to step 620 to retrieve information about the selected analysis, such as particular positive and/or negative factors, related weights, a corresponding authorization threshold value, etc. The routine then continues to step 625 to analyze the information for the proposed item transaction based on the retrieved selected analysis information, and in step 630 determines an authorization score for the proposed item transaction based on the analysis. In step 635, the routine then determines whether to authorize the transaction based on the analysis, such as using the determined authorization score and an associated authorization threshold value. If it is determined in step 640 that the transaction was selectively authorized, the routine proceeds to step 650 to indicate the transaction was authorized, and if not continues to step 645 to indicate that the transaction was not authorized.

After steps 645 or 650, the routine proceeds to step 695 to determine whether to continue. If so, the routine returns to step 605, and if not ends at step 699.

As previously noted, the selective authorization may be initiated in various ways in various embodiments. For example, selective authorization may be used automatically whenever third-party payment processing systems are inaccessible, while in other embodiments the selective authorization may instead be automatically triggered by one or more of other conditions (e.g., after a predetermined amount of time when payment processing systems are inaccessible). Alternatively, a human representative of the merchant may initiate the selective authorization manually in certain situations, such as when some payment-related functionality of the item transaction system is temporarily unavailable. Furthermore, selective authorization functionality may be triggered by certain types of payment declines, such as soft payment declines when a credit limit has been exceeded, when the payment processing system indicates it is unable to communicate with the financial institution associated with the payment instrument, etc.

It will also be appreciated that, although in some embodiments the techniques may be used on behalf of a large online merchant that sells a wide variety of items, the techniques may also be used in other situations, such as for smaller online merchants selling only one or a limited number of items and for payments in situations other than related to item acquisition transactions. In addition, while the techniques may be used to selectively authorize the transactions at online merchants, in other embodiments the techniques may be utilized to selectively authorize transactions at brick-and-mortar merchants, such as when other payment processing systems are unavailable. Similarly, in some embodiments, the techniques may be used by third-party payment intermediaries.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing, it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A method for a computing system of an online merchant to automatically authorize proposed item purchase transactions in a selective manner, the method comprising:
   automatically analyzing information about prior purchase transactions in which customers purchased items from the online merchant but the online merchant did not successfully obtain payment from the customers for the items, each of the prior purchase transactions having a credit card indicated to be used for an indicated payment amount for one or more items, the analyzing for use in identifying factors that are frequently associated with payment not being received;
   receiving indications of multiple proposed purchase transactions that each involve a customer of the online merchant purchasing one or more items from the online merchant for an indicated payment amount, each proposed transaction having an indicated credit card of the customer to be used by the online merchant to obtain the indicated payment amount for the proposed transaction;
   for each of the proposed purchase transactions, determining whether to perform the proposed transaction based on assessing whether the online merchant will successfully obtain the indicated payment amount for the proposed transaction using the indicated credit card for the proposed transaction, by
      if a third-party credit card payment processing system is available, automatically determining to perform the proposed transaction if approval is received from the credit card payment processing system for the indicated payment amount using the indicated credit card for the proposed transaction; and
      if the third-party credit card payment processing system is not available, automatically determining to perform the proposed transaction if an assessed likelihood of receiving the indicated payment amount using the indicated credit card for the proposed transaction exceeds a predetermined threshold, the assessed likelihood being based at least in part on whether one or more of the identified factors are present for the proposed transaction; and
   for each proposed purchase transaction that is determined to be performed, initiating delivery of the one or more items for the proposed transaction.

2. The method of claim 1 further comprising automatically analyzing information about other prior purchase transactions in which the online merchant did successfully obtain payment from customers for items being purchased from the online merchant, each of the prior purchase transactions having a credit card indicated to be used for an indicated payment amount for one or more items, the analyzing for use in identifying additional factors that are frequently associated with payment being received, and wherein the assessed likelihood of receiving an indicated payment amount using an indicated credit card for a proposed transaction is further based at least in part on whether one or more of the identified additional factors are present for the proposed transaction.

3. The method of claim 1 further comprising:
   automatically analyzing information about other prior purchase transactions that each have a payment instrument of a type other than a credit card, the analyzing for use in identifying additional factors that are frequently associated with payment not being received when using a payment instrument other than a credit card; and using the identified additional factors to automatically determine whether to perform one or more additional proposed purchase transactions that each have an indicated payment instrument other than a credit card to be used by the online merchant to obtain an indicated payment amount for one or more items being purchased by the customer from the online merchant.

4. The method of claim 1 further comprising, for each of the proposed purchase transactions that are automatically determined to be performed while the third-party credit card payment processing system is not available, later interacting with the third-party credit card payment processing system after it becomes available in order to attempt to obtain approval for the indicated payment amount for the proposed transaction using the indicated credit card for the proposed transaction.

5. The method of claim 1 wherein the analyzing of the information about the prior purchase transactions includes statistically determining that the identified factors are strongly correlated with the online merchant not successfully obtaining payment, and wherein the identified factors include at least one of particular items, types of items, payment amounts, types of credit cards, customer location, and information about prior customer activities involving interactions with the online merchant.

6. The method of claim 1 further comprising, for each of at least one of the proposed purchase transactions, if the third-party credit card payment processing system is available and approval is not received from the credit card payment processing system for an indicated payment amount using an indicated credit card for the proposed purchase transaction, automatically determining to perform the proposed sales transaction if an assessed likelihood of receiving the indicated payment amount for the proposed transaction from the customer exceeds a predetermined threshold, the assessed likelihood being based at least in part on whether one or more of the identified factors are present for the proposed transaction.

7. The method of claim 1 wherein the third-party credit card payment processing system is not available because of at least one of unavailability of one or more components of the computing system of the online merchant, unavailability of a communication link between the computing system of the online merchant and the third-party credit card payment processing system, and unavailability of one or more components of the third-party credit card payment processing system.

8. The method of claim 1 wherein the automatic determining of whether to perform a proposed purchase transaction when the third-party credit card payment processing system is not available is further based at least in part on costs to the online merchant associated with not currently authorizing the proposed purchase transaction.

9. A computer-implemented method for a merchant to automatically authorize proposed transactions for items in a selective manner, the method comprising:
receiving information about a proposed transaction that involves a merchant providing one or more items to a recipient in exchange for the merchant receiving an indicated payment from a customer, the received information including an indication of how the customer will provide the indicated payment;
automatically analyzing information regarding one or more prior transactions related to the proposed transaction in order to identify factors that are associated with at least one of successfully obtaining payment for a transaction and of unsuccessfully obtaining payment for a transaction, the automatic analyzing being performed by a configured computing system;
automatically attempting to obtain assurance of receipt of the indicated payment from the customer by the merchant based on one or more interactions with one or more third-party payment processing systems;
if the receipt by the merchant of the indicated payment from the customer is not assured, automatically determining whether to authorize the proposed transaction in a selective manner based at least in part on information specific to the proposed transaction and at least in part on the identified factors from the automatic analyzing of the information regarding the one or more prior transactions, the automatic determining being performed by the configured computing system; and
if it is determined to authorize the proposed transaction, initiating the providing of the one or more items to the recipient before the receiving by the merchant of the indicated payment.

10. The method of claim 9 further comprising, if the receipt by the merchant of the indicated payment is assured, initiating the providing of the one or more items to the recipient without performing the automatic determining of whether to authorize the proposed transaction in the selective manner.

11. The method of claim 9 wherein the indicated payment is assured if the indicated payment is received by the merchant and/or if the receipt by the merchant of the indicated payment is guaranteed.

12. The method of claim 9 wherein the indication of how the customer will provide the indicated payment includes an indication of a payment instrument to be used for the payment, and wherein the method further comprises determining that the indicated payment is not assured based on at least one of an inability to confirm that the payment instrument has a current ability to provide the indicated payment, an inability to confirm that use of the indicated payment instrument by the customer is authorized, an inability to access information for use in obtaining the indicated payment, an inability to interact with one or more third-party payment processing systems, and a response from a third-party payment processing system that does not indicate that the indicated payment is assured.

13. The method of claim 9 further comprising, if it is determined not to authorize the item transaction, attempting at a later time to obtain assurance of the merchant receiving the indicated payment from the customer based on one or more additional interactions with one or more third-party payment processing systems, and if the receiving by the merchant of the indicated payment is assured at the later time, initiating the providing of the one or more items to the recipient.

14. The method of claim 9 further comprising, after the initiating of the providing of the one or more items to the recipient before the receipt by the merchant of the indicated payment, interacting with the one or more third-party payment processing systems to attempt to obtain the indicated payment.

15. The method of claim 9 wherein the analyzing of the information regarding the prior transactions includes statistically determining that the identified factors are correlated with at least one of successfully obtaining payment for a transaction and of unsuccessfully obtaining payment for a transaction.

16. The method of claim 9 wherein the identified factors include at least one of particular items, types of items, payment amounts, types of payment instruments, customer location, and information about prior customer activities.

17. The method of claim 9 wherein the automatic determining of whether to authorize the proposed transaction in the selective manner based on the identified factors includes determining the identified factors that are present in the proposed transaction and generating an assessed score for the proposed transaction based on the determined factors that are present.

18. The method of claim 9 wherein the identified factors include one or more positive factors that are associated with successfully obtaining payment for a transaction and one or more negative factors that are associated with unsuccessfully obtaining payment for a transaction.

19. The method of claim 9 wherein the automatic determining of whether to authorize the proposed transaction in the selective manner is further based at least in part on a date by which the one or more items are to be provided to the recipient.

20. The method of claim 9 wherein the initiating of the providing of the one or more items to the recipient includes initiating a shipping process that includes packaging the one or more items and shipping the packaged items to the recipient, and wherein the automatic determining of whether to authorize the proposed transaction in the selective manner is further based at least in part on whether the shipping process can be halted for at least a selected period of time after the initiating of the shipping-process.

21. The method of claim 9 wherein the automatic determining of whether to authorize the proposed transaction in the selective manner is further based at least in part on costs to the merchant associated with not currently authorizing the proposed transaction.

22. The method of claim 9 wherein the one or more prior transactions related to the proposed transaction include multiple prior transactions where payment was successfully received by the merchant and multiple prior transactions where payment was not successfully received by the merchant.

23. The method of claim 9 wherein the indication of how the customer will provide the indicated payment includes an indication of a payment instrument to be used for the payment, and wherein the one or more prior transactions related to the proposed transaction are determined based on at least one of an amount of the indicated payment, a type of the payment instrument, a currency of the indicated payment, a method of providing the one or more items to the recipient, the one or more items, a type of at least one of the one or more items, and a quantity of the one or more items.

24. The method of claim 9 wherein the indication of how the customer will provide the indicated payment includes an indication of a payment instrument to be used for the payment, and wherein the one or more prior transactions related to the proposed transaction are determined based at least in part on all of an amount of the indicated payment, a type of the payment instrument, a currency of the indicated payment, a method of providing the one or more items to the recipient, the one or more items, a type of at least one of the one or more items, and a quantity of the one or more items.

25. The method of claim 9 wherein the information specific to the proposed transaction on which the automatic determining of whether to authorize the proposed transaction in a selective manner is based includes information about the one or more items.

26. The method of claim 9 wherein the information specific to the proposed transaction on which the automatic determining of whether to authorize the proposed transaction in a selective manner is based includes information about an amount of the indicated payment.

27. The method of claim 9 wherein the information specific to the proposed transaction on which the automatic determining of whether to authorize the proposed transaction in a selective manner is based includes information about the recipient.

28. The method of claim 9 wherein the information specific to the proposed transaction on which the automatic determining of whether to authorize the proposed transaction in a selective manner is based includes information about the customer.

29. The method of claim 28 wherein the information about the customer includes information about prior activities of the customer.

30. The method of claim 29 wherein the prior activities of the customer include one or more prior transactions involving the merchant and the customer, and wherein the one or more prior transactions related to the proposed transaction include the one or more prior transactions involving the merchant and the customer.

31. The method of claim 9 wherein the attempting to obtain the assurance of the receipt of the indicated payment from the customer by the merchant based on the one or more interactions with the one or more third-party payment processing systems includes a failure to obtain the assurance based on a lack of any information received from the one or more third-party payment processing systems regarding the indicated payment from the customer for the proposed transaction, and wherein the automatic determining of whether to authorize the proposed transaction is further performed without use of any information from the one or more third-party payment processing systems regarding the proposed transaction.

32. The method of claim 9 wherein the indication of how the customer will provide payment includes an indication of at least one of a credit card, a debit card, a stored value card, a bank account for use in an ACH transaction, a wire transfer, an electronic benefits transfer, a gift card, an electronic gift certificate, and a loyalty points account.

33. The method of claim 9 wherein the merchant is at least one of an online merchant, and a merchant that takes orders for items using credit card payments without physical confirmation of the credit cards being used.

34. The method of claim 9 wherein the recipient is the customer for the proposed transaction, and wherein the method is performed for each of at least some of multiple proposed transactions.

35. The method of claim 9 wherein the one or more items to be provided to the recipient include one or more physical products to be delivered to the recipient.

36. The method of claim 9 wherein the one or more items to be provided to the recipient include one or more products in electronic form to be electronically delivered to the recipient.

37. The method of claim 9 wherein the one or more items to be provided to the recipient include one or more services to be provided to the recipient.

38. A computer-implemented method for a merchant to automatically authorize proposed transactions for items in a selective manner, the method comprising:

receiving information about a first proposed transaction that involves a merchant providing one or more items to a recipient in exchange for the merchant receiving an indicated payment from a customer, the received information including an indication of how the customer will provide the indicated payment;

automatically attempting to obtain assurance of receipt of the indicated payment from the customer by the merchant based on one or more interactions with one or more third-party payment processing systems, the automatic attempting being performed by a configured computing system of the merchant;

if the receipt by the merchant of the indicated payment from the customer is not assured, automatically determining whether to authorize the first proposed transaction in a selective manner based at least in part on information specific to the first proposed transaction and at least in part on information regarding one or more prior transactions related to the first proposed transaction, the automatic determining being performed by the configured computing system of the merchant;

if it is determined to authorize the first proposed transaction, initiating the providing of the one or more items to the recipient before the receiving by the merchant of the indicated payment;

receiving information about multiple proposed transactions involving multiple customers such that each of the multiple proposed transactions involves the merchant providing one or more items to a recipient in exchange for payment from one of the multiple customers;

failing to obtain assurance of receipt by the merchant of the payments from the multiple customers for the multiple proposed transactions;

selecting a subset of the multiple proposed transactions to consider for automated selective authorization; and for each of the multiple proposed transactions of the selected subset, automatically determining whether to authorize that proposed transaction in a selective manner based at least in part on information specific to that proposed transaction.

39. The method of claim 38 wherein the selecting of the subset of the multiple proposed transactions includes selecting each of at least some of the proposed transactions of the subset based at least in part on an amount of time until the one or more items of that proposed transaction are expected to be provided to the recipient for that proposed transaction.

40. The method of claim 38 wherein the selecting of the subset of the multiple proposed transactions includes selecting each of at least some of the proposed transactions of the subset based at least in part on information about the one or more items of that proposed transaction.

41. The method of claim 38 wherein the selecting of the subset of the multiple proposed transactions includes selecting each of at least some of the proposed transactions of the subset based at least in part on information about the customer and/or the recipient for that proposed transaction.

42. The method of claim 38 wherein the failing to obtain the assurance of the receipt by the merchant of the payments from the multiple customers for the multiple proposed transactions is based on an inability to interact with one or more third-party payment processing systems that provide information related to receipt of payments from customers, and wherein fulfillment of the multiple proposed transactions that are not in the selected subset is delayed until interactions with the one or more third-party payment processing systems are able to provide information related to the receipt of the payments for the multiple proposed transactions that are not in the selected subset.

43. The method of claim 38 wherein the failing to obtain the assurance of the receipt by the merchant of the payments from the multiple customers for the multiple proposed transactions is based on an inability to interact with one or more third-party payment processing systems that provide information related to receipt of payments from customers, and further comprising:

delaying fulfillment of the unselected proposed transactions that are not in the selected subset while performing further attempts to engage in interactions with the one or more third-party payment processing systems to obtain the assurance of the receipt by the merchant of the payments for the unselected proposed transactions; and after an additional period of time has elapsed while still failing to obtain the assurance of the receipt by the merchant of the payments for the unselected proposed transactions, automatically determining whether to authorize each of at least some of the unselected proposed transactions in a selective manner based at least in part on information specific to that proposed transaction.

44. The method of claim 38 further comprising, if the receipt by the merchant of the indicated payment is assured, initiating the providing of the one or more items to the recipient without performing the automatic determining of whether to authorize the first proposed transaction in the selective manner.

45. The method of claim 38 wherein the indication of how the customer will provide the indicated payment includes an indication of a payment instrument to be used for the payment, and wherein the method further comprises determining that the indicated payment is not assured based on at least one of an inability to confirm that the payment instrument has a current ability to provide the indicated payment, an inability to confirm that use of the indicated payment instrument by the customer is authorized, an inability to access information for use in obtaining the indicated payment, an inability to interact with one or more third-party payment processing systems, and a response from a third-party payment processing system that does not indicate that the indicated payment is assured.

46. The method of claim 38 wherein, for each of the multiple proposed transactions of the selected subset, the information specific to that proposed transaction on which the automatic determining of whether to authorize that proposed transaction in a selective manner is based includes information about at least one of the one or more items to be provided to the recipient for that proposed transaction, of an amount of the payment for that proposed transaction, and of the recipient for that proposed transaction.

47. The method of claim 38 wherein, for each of the multiple proposed transactions of the selected subset, the information specific to that proposed transaction on which the automatic determining of whether to authorize that proposed transaction in a selective manner is based includes information about prior activities of the one customer for that proposed transaction.

48. The method of claim 38 wherein, for each of the multiple proposed transactions of the selected subset, the automatic determining of whether to authorize that proposed transaction is performed without use of any information from the one or more third-party payment processing systems regarding that proposed transaction.

49. The method of claim 38 wherein, for each of the multiple proposed transactions of the selected subset, the received information for that proposed transaction includes an indication of how the one customer for that proposed transaction will provide the payment for that proposed transaction, the indication being of at least one of a credit card, a debit card, a stored value card, a bank account for use in an ACH transaction, a wire transfer, an electronic benefits transfer, a gift card, an electronic gift certificate, and a loyalty points account, and the automatic determining of whether to authorize that proposed transaction is performed based in part on the indication of how the one customer will provide the payment.

50. A computer-readable medium whose contents include instructions that when executed configure a computing system to perform a method, the method comprising:
- receiving information about a proposed transaction that involves a merchant providing one or more items to a recipient in exchange for the merchant receiving an indicated payment from a customer, the received information including an indication of how the customer will provide the indicated payment;
- automatically analyzing information regarding one or more related prior transactions in order to identify factors that are associated with at least one of successfully obtaining payment for transactions and of unsuccessfully obtaining payment for transactions, the automatic analyzing being performed by the configured computing system;
- automatically attempting to obtain assurance of receipt of the indicated payment from the customer by the merchant based on one or more interactions with one or more third-party payment processing systems;
- if the receipt by the merchant of the indicated payment from the customer is not assured, automatically determining whether to authorize the proposed transaction in a selective manner based at least in part on information specific to the proposed transaction and at least in part on the identified factors from the automatic analyzing of the information regarding the one or more prior transactions, the automatic determining being performed by the configured computing system; and
- if it is determined to authorize the proposed transaction, initiating the providing of the one or more items to the recipient before the receiving by the merchant of the indicated payment.

51. The computer-readable medium of claim 50 wherein the method further comprises, if the receipt by the merchant of the indicated payment is assured, initiating the providing of the one or more items to the recipient without performing the automatic determining of whether to authorize the proposed transaction in the selective manner, and wherein the computer-readable medium is a memory of the computing system.

52. The computer-readable medium of claim 50 wherein the indication of how the customer will provide the indicated payment includes an indication of a payment instrument to be used for the payment, and wherein the method further comprises determining that the indicated payment is not assured based on at least one of an inability to confirm that the payment instrument has a current ability to provide the indicated payment, an inability to confirm that use of the indicated payment instrument by the customer is authorized, an inability to access information for use in obtaining the indicated payment, an inability to interact with one or more third-party payment processing systems, and a response from a third-party payment processing system that does not indicate that the indicated payment is assured.

53. The computer-readable medium of claim 50 wherein the one or more prior transactions include at least one of multiple prior transactions where payment was successfully received by the merchant and of multiple prior transactions where payment was not successfully received by the merchant, wherein the automatic analyzing of the information regarding the one or more prior transactions is performed before the receiving of the information about the proposed transaction, and wherein the analyzing of the information regarding the prior transactions includes statistically determining that the identified factors are correlated with at least one of successfully obtaining payment for a transaction and of unsuccessfully obtaining payment for a transaction.

54. The computer-readable medium of claim 50 wherein the identified factors include at least one of particular items, types of items, payment amounts, types of payment instruments, customer location, and information about prior customer activities, and wherein the automatic determining of whether to authorize the proposed transaction in the selective manner based on the identified factors includes determining the identified factors that are present in the proposed transaction.

55. The computer-readable medium of claim 50 wherein the information specific to the proposed transaction on which the automatic determining of whether to authorize the proposed transaction in a selective manner is based includes information about at least one of the one or more items, of an amount of the indicated payment, of the recipient, and of prior activities of the customer.

56. The computer-readable medium of claim 50 wherein the indication of how the customer will provide payment includes an indication of at least one of a credit card, a debit card, a stored value card, a bank account for use in an ACH transaction, a wire transfer, an electronic benefits transfer, a gift card, an electronic gift certificate, and a loyalty points account, and wherein the automatic determining of whether to authorize the proposed transaction is performed based in part on the indication of how the customer will provide the payment.

57. A computing system, comprising:
- one or more processors; and
- one or more components having software instructions that, when executed by at least one of the one or more processors:
  - receive information about a proposed transaction that involves a merchant providing one or more items to a recipient in exchange for the merchant receiving an indicated payment from a customer, the received information including an indication of how the customer will provide the indicated payment;
  - automatically analyze information regarding one or more related prior transactions in order to identify factors that are associated with at least one of successfully obtaining payment for a transaction and of unsuccessfully obtaining payment for a transaction;
  - automatically attempt to obtain assurance of receipt of the indicated payment from the customer by the merchant based on one or more interactions with one or more third-party payment processing systems;
  - if the receipt by the merchant of the indicated payment from the customer is not assured, automatically determine whether to authorize the proposed transaction in a selective manner based at least in part on information specific to the proposed transaction and at least in part on the identified factors from the automatic analyzing of the information regarding the one or more prior transactions; and
  - if it is determined to authorize the proposed transaction, initiate the providing of the one or more items to the recipient before the receiving by the merchant of the indicated payment.

58. The computing system of claim 57 wherein the one or more components are further configured to, if the receipt by the merchant of the indicated payment is assured, initiate the providing of the one or more items to the recipient without performing the automatic determining of whether to authorize the proposed transaction in the selective manner.

59. The computing system of claim 57 wherein the indication of how the customer will provide the indicated payment includes an indication of a payment instrument to be used for the payment, and wherein the one or more components are further configured to determine that the indicated payment is not assured based on at least one of an inability to confirm that the payment instrument has a current ability to provide the indicated payment, an inability to confirm that use of the indicated payment instrument by the customer is authorized, an inability to access information for use in obtaining the indicated payment, an inability to interact with one or more third-party payment processing systems, and a response from a third-party payment processing system that does not indicate that the indicated payment is assured.

60. The computing system of claim 57 wherein the one or more prior transactions include at least one of multiple prior transactions where payment was successfully received by the merchant and of multiple prior transactions where payment was not successfully received by the merchant, wherein the automatic analyzing of the information regarding the one or more prior transactions is performed before the receiving of the information about the proposed transaction, and wherein the analyzing of the information regarding the prior transactions includes statistically determining that the identified factors are correlated with at least one of successfully obtaining payment for a transaction and of unsuccessfully obtaining payment for a transaction.

61. The computing system of claim 57 wherein the identified factors include at least one of particular items, types of items, payment amounts, types of payment instruments, customer location, and information about prior customer activities, and wherein the automatic determining of whether to authorize the proposed transaction in the selective manner based on the identified factors includes determining the identified factors that are present in the proposed transaction.

62. The computing system of claim 57 wherein the information specific to the proposed transaction on which the automatic determining of whether to authorize the proposed transaction in a selective manner is based includes information about the one or more items, an amount of the indicated payment, the recipient, and prior activities of the customer.

63. The computing system of claim 57 wherein the indication of how the customer will provide payment includes an indication of at least one of a credit card, a debit card, a stored value card, a bank account for use in an ACH transaction, a wire transfer, an electronic benefits transfer, a gift card, an electronic gift certificate, and a loyalty points account, and wherein the automatic determining of whether to authorize that proposed transaction is performed based in part on the indication of how the customer will provide the payment.

* * * * *

UNITED STATES PATENT AND TRADEMARK OFFICE
CERTIFICATE OF CORRECTION

| | | |
|---|---|---|
| PATENT NO. | : 7,959,074 B1 | Page 1 of 1 |
| APPLICATION NO. | : 11/537463 | |
| DATED | : June 14, 2011 | |
| INVENTOR(S) | : Rajiv Chopra et al. | |

It is certified that error appears in the above-identified patent and that said Letters Patent is hereby corrected as shown below:

Column 19, Line 26:
"initiating of the shipping-process." should read, --initiating of the shipping process.--.

Signed and Sealed this

Thirty-first Day of January, 2012

David J. Kappos
*Director of the United States Patent and Trademark Office*